(12) United States Patent
Ramirez-Corredores et al.

(10) Patent No.: US 9,447,350 B2
(45) Date of Patent: Sep. 20, 2016

(54) PRODUCTION OF RENEWABLE BIO-DISTILLATE

(71) Applicant: Inaeris Technologies, LLC, Pasadena, TX (US)

(72) Inventors: Maria Magdalena Ramirez-Corredores, Houston, TX (US); Changan Zhang, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 168 days.

(21) Appl. No.: 13/964,873

(22) Filed: Aug. 12, 2013

(65) Prior Publication Data
US 2013/0326936 A1 Dec. 12, 2013

Related U.S. Application Data

(63) Continuation-in-part of application No. 13/533,432, filed on Jun. 26, 2012, now Pat. No. 8,506,658, which is a continuation of application No. 12/915,872, filed on Oct. 29, 2010, now Pat. No. 8,377,152.

(51) Int. Cl.
*C10G 3/00* (2006.01)
*C10L 1/19* (2006.01)
(Continued)

(52) U.S. Cl.
CPC . *C10L 1/19* (2013.01); *C10G 1/02* (2013.01); *C10G 1/08* (2013.01); *C10G 3/42* (2013.01); *C10G 3/50* (2013.01); *C10L 1/02* (2013.01); *C10L 1/04* (2013.01); *C11B 13/00* (2013.01);
(Continued)

(58) Field of Classification Search
CPC .......... C10L 1/02; C10L 1/023; C10L 1/026; C10L 1/04; C10L 1/06; C10L 1/08; C10L 1/14; C10L 1/18; C10L 1/188; C10L 1/19; C10G 1/00; C10G 1/08; C10G 1/083; C10G 3/00; C10G 3/42
See application file for complete search history.

(56) References Cited

U.S. PATENT DOCUMENTS

| 4,147,593 A | 4/1979 | Frischmuth et al. |
| 4,209,647 A | 6/1980 | Gallivan et al. |

(Continued)

FOREIGN PATENT DOCUMENTS

| CN | 101144025 A | 3/2008 |
| CN | 101824330 | 9/2010 |

(Continued)

OTHER PUBLICATIONS

International Search Report dated Feb. 24, 2012 from corresponding PCT Patent Application No. PCT/US2011/055355, filed on Oct. 7, 2011; 16 pages.

(Continued)

*Primary Examiner* — Brian McCaig
(74) *Attorney, Agent, or Firm* — Dunlap Codding, P.C.

(57) ABSTRACT

A process and system for separating a light fraction, a bio-distillate fraction, and a heavy fraction from a bio-oil, and for producing a renewable distillate including at least in part the bio-distillate fraction and a stabilizing additive, is provided. In addition, a process and system is provided for upgrading a bio-oil by use of a diluent and/or a recycle stream from the upgrading process to reduce fouling in upgrading equipment, such as a preheater and a hydrodeoxygenation unit.

25 Claims, 5 Drawing Sheets

(51) Int. Cl.
*C10L 1/02* (2006.01)
*C10L 1/04* (2006.01)
*C11B 13/00* (2006.01)
*C11C 3/00* (2006.01)
*C10G 1/02* (2006.01)
*C10G 1/08* (2006.01)
*C10G 1/00* (2006.01)

(52) U.S. Cl.
CPC .......... *C11C 3/00* (2013.01); *C10G 2300/1011* (2013.01); *C10G 2300/1014* (2013.01); *C10G 2300/1037* (2013.01); *C10G 2300/301* (2013.01); *C10G 2300/80* (2013.01); *C10G 2300/802* (2013.01); *Y02P 30/20* (2015.11); *Y02W 30/74* (2015.05)

(56) References Cited

U.S. PATENT DOCUMENTS

| | | |
|---|---|---|
| 4,222,845 A | 9/1980 | Schmid |
| 4,299,690 A | 11/1981 | Allan |
| 4,304,649 A | 12/1981 | Han et al. |
| 4,396,487 A | 8/1983 | Strumskis |
| 4,405,448 A | 9/1983 | Googin et al. |
| 4,512,239 A | 4/1985 | Watanabe et al. |
| 4,551,239 A | 11/1985 | Merchant et al. |
| 4,645,585 A | 2/1987 | White |
| 4,723,963 A | 2/1988 | Taylor |
| 4,795,841 A | 1/1989 | Elliott et al. |
| 4,942,269 A | 7/1990 | Chum et al. |
| 4,960,507 A | 10/1990 | Evans et al. |
| 5,104,545 A | 4/1992 | Means et al. |
| 5,223,601 A | 6/1993 | Chum et al. |
| 5,395,455 A | 3/1995 | Scott et al. |
| 5,792,340 A | 8/1998 | Freel et al. |
| 5,820,640 A | 10/1998 | Ikura et al. |
| 5,877,380 A | 3/1999 | Conroy et al. |
| 5,882,506 A | 3/1999 | Ohsol et al. |
| 5,922,206 A | 7/1999 | Darlington, Jr. et al. |
| 6,007,702 A | 12/1999 | Schievelbein |
| 6,172,272 B1 | 1/2001 | Shabtai et al. |
| 6,602,404 B2 | 8/2003 | Walsh et al. |
| 6,814,940 B1 | 11/2004 | Hiltunen et al. |
| 6,830,597 B1 | 12/2004 | Green |
| 7,004,999 B2 | 2/2006 | Johnson et al. |
| 7,262,331 B2 | 8/2007 | Van de Beld et al. |
| 7,279,018 B2 | 10/2007 | Jakkula et al. |
| 7,300,568 B2 | 11/2007 | Ketley et al. |
| 7,311,739 B2 | 12/2007 | Bongart et al. |
| 7,319,168 B2 | 1/2008 | Sanada |
| 7,425,657 B1 | 9/2008 | Elliott et al. |
| 7,501,054 B2 | 3/2009 | Galiasso |
| 7,501,374 B2 | 3/2009 | Galiasso |
| 7,578,927 B2 | 8/2009 | Marker et al. |
| 7,638,314 B2 | 12/2009 | Zappi et al. |
| 7,781,191 B2 | 8/2010 | Dunson, Jr. et al. |
| 7,816,570 B2 | 10/2010 | Roberts, IV et al. |
| 7,819,930 B2 | 10/2010 | Adams et al. |
| 7,861,696 B2 | 1/2011 | Lund |
| 7,883,882 B2 | 2/2011 | Franklin et al. |
| 7,888,540 B2 | 2/2011 | Deluga et al. |
| 7,892,300 B2 | 2/2011 | Galiasso |
| 8,075,642 B2 | 12/2011 | Dumesic et al. |
| 8,083,900 B2 | 12/2011 | Lin |
| 8,097,172 B2 | 1/2012 | Islam et al. |
| 8,101,808 B2 | 1/2012 | Evanko et al. |
| 8,158,842 B2 | 4/2012 | McCall |
| 8,202,332 B2 | 6/2012 | Agblevor |
| 8,236,173 B2 | 8/2012 | Bartek et al. |
| 8,236,977 B2 | 8/2012 | Woods et al. |
| 8,329,967 B2 | 12/2012 | Brandvold et al. |
| 8,329,969 B2 | 12/2012 | McCall et al. |
| 8,377,152 B2 | 2/2013 | Ramirez Corredores et al. |
| 8,454,712 B2 | 6/2013 | Ramirez-Corredores et al. |
| 8,506,658 B2 | 8/2013 | Corredores et al. |
| 8,519,203 B2 | 8/2013 | Marinangeli et al. |
| 8,545,581 B2 | 10/2013 | Agblevor |
| 8,598,378 B2 | 12/2013 | Cooney et al. |
| 8,628,589 B2 | 1/2014 | Ramirez Corredores et al. |
| 8,669,405 B2 | 3/2014 | Ramirez Corredores et al. |
| 8,853,484 B2 | 10/2014 | Ramirez Corredores et al. |
| 8,979,955 B2 | 3/2015 | Agblevor et al. |
| 2003/0115792 A1 | 6/2003 | Shabtai et al. |
| 2003/0207407 A1 | 11/2003 | Buchanan et al. |
| 2004/0055209 A1 | 3/2004 | Jakkula et al. |
| 2004/0111955 A1 | 6/2004 | Mullay et al. |
| 2006/0041152 A1 | 2/2006 | Cantrell et al. |
| 2006/0070912 A1 | 4/2006 | Khan |
| 2006/0161032 A1 | 7/2006 | Murzin et al. |
| 2007/0007188 A1 | 1/2007 | Skrypski-Mantele et al. |
| 2007/0161095 A1 | 7/2007 | Gurin |
| 2007/0260102 A1 | 11/2007 | Duarte Santiago et al. |
| 2007/0261296 A1 | 11/2007 | Adams et al. |
| 2008/0006520 A1 | 1/2008 | Badger et al. |
| 2008/0050792 A1 | 2/2008 | Zmierczak et al. |
| 2008/0172931 A1 | 7/2008 | Bazzani et al. |
| 2008/0217211 A1 | 9/2008 | Chornet et al. |
| 2008/0264771 A1 | 10/2008 | Dam-Johansen et al. |
| 2008/0300434 A1 | 12/2008 | Cortright et al. |
| 2008/0312476 A1 | 12/2008 | McCall |
| 2009/0000185 A1 | 1/2009 | Aulich et al. |
| 2009/0007484 A1 | 1/2009 | Smith |
| 2009/0054711 A1 | 2/2009 | Lawrence et al. |
| 2009/0065378 A1 | 3/2009 | Maas |
| 2009/0119979 A1 | 5/2009 | Mullen |
| 2009/0124839 A1 | 5/2009 | Dumesic et al. |
| 2009/0139851 A1 | 6/2009 | Freel |
| 2009/0151233 A1 | 6/2009 | Miller |
| 2009/0165378 A1 | 7/2009 | Agblevor |
| 2009/0166256 A1 | 7/2009 | Lewis et al. |
| 2009/0182064 A1 | 7/2009 | Griffin |
| 2009/0182166 A1 | 7/2009 | Kubatova et al. |
| 2009/0182199 A1 | 7/2009 | Rudischhauser et al. |
| 2009/0227823 A1 | 9/2009 | Huber et al. |
| 2009/0229173 A1 | 9/2009 | Gosling |
| 2009/0234030 A1 | 9/2009 | Gouman |
| 2009/0234146 A1 | 9/2009 | Cooney et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0259082 A1 | 10/2009 | Deluga et al. |
| 2009/0294324 A1 | 12/2009 | Brandvold et al. |
| 2009/0301930 A1 | 12/2009 | Brandvold et al. |
| 2009/0318737 A1 | 12/2009 | Luebke |
| 2010/0002792 A1 | 1/2010 | Seyedi-Esfahani |
| 2010/0064574 A1 | 3/2010 | de Almeida et al. |
| 2010/0076238 A1 | 3/2010 | Brandvold et al. |
| 2010/0083566 A1 | 4/2010 | Fredriksen et al. |
| 2010/0105970 A1 | 4/2010 | Yanik et al. |
| 2010/0162625 A1 | 7/2010 | Mills |
| 2010/0212215 A1 | 8/2010 | Agblevor |
| 2010/0218417 A1 | 9/2010 | Bauldreay et al. |
| 2010/0256428 A1 | 10/2010 | Marker et al. |
| 2011/0003218 A1 | 1/2011 | Stolte et al. |
| 2011/0068049 A1 | 3/2011 | Garcia, III et al. |
| 2011/0083998 A1 | 4/2011 | Hamper et al. |
| 2011/0126449 A1 | 6/2011 | Xu et al. |
| 2011/0138681 A1 | 6/2011 | Ramirez Corredores et al. |
| 2011/0139262 A1 | 6/2011 | Aburto Anell et al. |
| 2011/0139602 A1 | 6/2011 | Lin et al. |
| 2011/0146140 A1 | 6/2011 | Brandvold et al. |
| 2011/0155631 A1 | 6/2011 | Knuuttila et al. |
| 2011/0192072 A1 | 8/2011 | Steele et al. |
| 2011/0245489 A1 | 10/2011 | Steele et al. |
| 2011/0259793 A1 | 10/2011 | Umansky et al. |
| 2011/0282118 A1 | 11/2011 | Shih |
| 2012/0000821 A1 | 1/2012 | Yang et al. |
| 2012/0005949 A1 | 1/2012 | Stevens et al. |
| 2012/0101317 A1 | 4/2012 | Knight et al. |
| 2012/0101318 A1 | 4/2012 | Ramirez Corredores et al. |
| 2012/0144730 A1 | 6/2012 | Stamires et al. |
| 2012/0151827 A1 | 6/2012 | Powell et al. |
| 2012/0172643 A1 | 7/2012 | Ramirez Corredores et al. |
| 2012/0190872 A1 | 7/2012 | Cranford et al. |

(56) References Cited

U.S. PATENT DOCUMENTS

| | | |
|---|---|---|
| 2012/0204479 A1 | 8/2012 | Ramirez Corredores et al. |
| 2012/0204481 A1 | 8/2012 | Corredores et al. |
| 2012/0216448 A1 | 8/2012 | Ramirez Corredores et al. |
| 2012/0289440 A1 | 11/2012 | Pollard et al. |
| 2012/0302765 A1 | 11/2012 | Dumesic et al. |
| 2012/0302767 A1 | 11/2012 | Dumesic et al. |
| 2013/0004646 A1 | 1/2013 | Franklin et al. |
| 2013/0014431 A1 | 1/2013 | Jin et al. |
| 2013/0023706 A1 | 1/2013 | Huber et al. |
| 2013/0035502 A1 | 2/2013 | Cohen et al. |
| 2013/0043192 A1* | 2/2013 | Smith et al. .................. 210/708 |
| 2013/0090502 A1 | 4/2013 | Laakkonen et al. |
| 2013/0140216 A1 | 6/2013 | Wickes et al. |
| 2013/0144089 A1 | 6/2013 | Fjare et al. |
| 2013/0174476 A1 | 7/2013 | Ramirez Corredores et al. |
| 2013/0291431 A1* | 11/2013 | Steele ..................... C10G 3/50 44/388 |
| 2014/0256965 A1 | 9/2014 | Asikkala et al. |
| 2014/0261715 A1* | 9/2014 | Abhari et al. ................. 137/12 |
| 2014/0288338 A1 | 9/2014 | Radelin et al. |
| 2015/0057475 A1* | 2/2015 | Wang ..................... B01J 29/44 585/251 |
| 2015/0184098 A1 | 7/2015 | Talwar |

FOREIGN PATENT DOCUMENTS

| | | |
|---|---|---|
| CN | 101875846 | 11/2010 |
| EP | 293069 | 6/1991 |
| EP | 0513051 | 12/1994 |
| EP | 0718392 | 9/1999 |
| EP | 1452579 | 9/2004 |
| EP | 1719811 | 11/2006 |
| EP | 2105456 | 9/2009 |
| EP | 2107100 | 10/2009 |
| EP | 2236584 | 10/2010 |
| EP | 2325281 | 5/2011 |
| GB | 2399571 | 9/2004 |
| KR | 10/0857247 | 9/2008 |
| WO | WO/00/71494 A1 | 11/2000 |
| WO | WO/01/07537 | 2/2001 |
| WO | 2006037368 | 4/2006 |
| WO | WO/2006/037368 | 4/2006 |
| WO | 2007128798 | 11/2007 |
| WO | 2007128800 | 11/2007 |
| WO | WO/2007/128800 | 11/2007 |
| WO | 2008020167 | 2/2008 |
| WO | 2009014859 | 1/2009 |
| WO | WO/2009/071495 | 6/2009 |
| WO | 2009082366 | 7/2009 |
| WO | WO/2009/082366 | 7/2009 |
| WO | WO 2009/111026 | 9/2009 |
| WO | WO/2009/115888 A1 | 9/2009 |
| WO | 2009126508 | 10/2009 |
| WO | WO/2009/126508 | 10/2009 |
| WO | WO/2009/130392 A1 | 10/2009 |
| WO | 2010002792 | 1/2010 |
| WO | 2010002886 | 1/2010 |
| WO | 2010008686 | 1/2010 |
| WO | WO/2010/002792 | 1/2010 |
| WO | WO/2010/002886 | 1/2010 |
| WO | 2010033512 | 3/2010 |
| WO | 2010033789 | 3/2010 |
| WO | WO/2010/033789 A2 | 3/2010 |
| WO | 2010068809 | 6/2010 |
| WO | WO 2010/088486 | 8/2010 |
| WO | WO 2010/124069 | 10/2010 |
| WO | 2010135734 | 11/2010 |
| WO | WO/2011/069510 A1 | 6/2011 |
| WO | WO/2011/096912 A1 | 8/2011 |
| WO | 2011143396 | 11/2011 |
| WO | WO/2012/035410 | 3/2012 |

OTHER PUBLICATIONS

Hilten, et al. "Comparisons of Three Accelerated Aging Procedures to Assess Bio-Oil Stability" Fuel 89(2010), 2741-2749.

Ikura, et al "Emulsification of Pyrolysis Derived Bio-Oil in Diesel Fuel" Biomass & BioEnergy 24 92003) 221-232.

Chiaramonti, et al. "Development of Emulsions From Biomass Pyrolysis Liquid and Diesel and Their Use in Engines, Part 1: Emulsion Production" Biomass & BioEnergy 25 (2003) 85-99.

Qi, et al. "Review of Biomass Pyrolysis Oil Properties and Upgrading Research", Energy Conversion & Management 48 (2007) 87-92.

Garcia-Perez, et al. "Production and Fuel Properties of Fast Pyrolysis Oil/Bio-Diesel Blends" Fuel Processing Technology 91 (2010) 296-305.

Ringer, et al. "Large-Scale Pyrolysis Oil Production: A Technology Assessment and Economic Analysis" NREL Technical Report, NREL/TP-510-37779, Nov. 2006.

Czernik, et al. "Stability of Wood Fast Pyrolysis Oil" Biomass and Bioenergy, vol. 7, Nos. 1-6, pp. 187-192, 1994 Great Britain.

Mahinpey, et al. "Analysis of Bio-Oil, Biogas, and Biochar From Pressurized Pyrolysis of Wheat Straw Using a Tubular Reactor" Energy & Fuels 2009, 23 2736-2742.

Czernik, et al. "Overview of Applications of Biomass Fast Pyrolysis Oil" Energy & Fuels 2004, 18, 590-598.

Oasmaa et al. "Fast Pyrolysis of Forestry Residue. 3. Storage Stability of Liquid Fuel" Energy & Fuels 2003, 17, 1075-1084.

Diebold, "A Review of the Chemical and Physical Mechanisms of the Storage Stability of Fast Pyrolysis Bio-Oils" NREL/SR-570-27613, Jan. 2000.

Moens, et al. "Study of the Neutralization and Stabilization of a Mixed Hardwood Bio-Oil" Energy & Fuels 2009, 23, 2695-2699.

Search Report and Written Opinion for corresponding PCT Application No. PCT/US2012/022951, filed on Jan. 27, 2012; Applicant: KiOR, Inc.; 12 pages.

Bridgwater et al., An Over of Fast Pyrolysos of Biomass, Organic Geochemistry 30 (1999), pp. 1479-1493, Bio-Energy Research Group, Chemical Engineering and Applied Chemistry Department, Aston University, Ontario, Canada.

Ozcimen et al., "Production and Characterization of Bio-Oil and Biochar From Rapeseed Cake", Renewable Energy 29 (2004), pp. 779-787, Department of Chemical Engineering, Instanbul Technical University, Istanbul, Turkey.

A.V. Bridgewater, G.V.C. Peacocke, "Fast Pyrolysos Processes for Biomass, Renewable and Sustainable Energy Reviews", vol. 4, pp. 1-73 (2000).

Richard Bain "Biodiesel and Other Renewable Diesel Fuels", publication, National Renewable Energy Laboratory, Nov. 2006.

Mathrop, "An Introduction to Petroleum Refining and the Production of Ultra Low Sulfur Gasoline and Diesel Fuel", publication, Mathrop, Inc. 2011.

Roger Leisenring, "Standard Specification for Diesel Fuel Oils", publication, ASTM International, Pennsylvania, Jan. 2012.

"HM 40 Guidelines for the Crude Oil Washing of Ships' Tanks and the Heating of Crude Oil Being Transported by Sea", publication, Energy Institute, London, Jun. 2004.

Sanchez et al., Properties of Gasoline and Biofuels Containing Renewable Drop-In Biofuel Blend Stocks Prepared by the Thermo-Catalytic Conversion of Lignocellulose, 2012 IASH Conference Presentation, KiOR, Inc. and Petro Tech Consultants LLC.

Sanchez, et al., "Renewable Fuel Bi-products Potential Use in Asphalt", 2012 AAPT Annual Meeting Presentation, KiOR, Inc. Texas 2012.

U.S. Appl. No. 13/964,873, filed Aug. 12, 2013; inventor: Ramirez-Corredores et al.

Huber et al., Production of Liquid Alkanes by Aqueous-Phase Processing of Biomass-Derived Carbohydrates; 308, 1146 to 1150 (2005).

Fukuda, Masanori et al., "The Effect of Fuel Aromatic Structure and Content on Direct Injection Diesel Engine Particulates"; Society of Automotive Engineers; [Progress in Technology] PT; PT-111 (alternative Diesel Fuels); 259-270 Coden: SAEPDU, 2004; XP009175497.

(56) References Cited

OTHER PUBLICATIONS

Mrad, Nadia et al. "Effects of Biofuel From Fish Oil Industrial Residue—Diesel Blends in Diesel Engine" vol. 44, No. 1; Aug. 1, 2012; pp. 955-963; XP55096129; ISSN: 0360-5442; DOI: 10-1016/j.energy.2012.04.056.
Han, Shen et al.; "Selecting Pour Depressants for Diesel Fuels"; Chemistry and Technology of Fuels and Oils; vol. 46., No. 5; Dec. 1, 2010; pp. 309-318.
Graboski, et al. NREL Report SR-510-31461 (Feb. 2003). The Effect of Biodiesel Composition on Engine Emissions from a DDC Series 60 Diesel Engine http://nanotechfuelcorporation.com/NOx/NREL_5.pdf.
Y.W. Deng, J. of Energy Oil and Gas Research, 1, 7-11 (2012). A Study on Relationship Between the Compositions and Properties of Fuel and Emissions from Diesel Engine with Fuzzy-Gray Theory http://www.e3journals.org/cms/articles/1330899070_Deng.pdf.
Environmental Protection Agency, Technology Transfer Network Clearinghouse for Inventories and Emission Factors (2012) http://www.epa.gov/ttn/chief/trends/index.html.
Preliminary Report on Patentability for co-pending PCT Patent Application No. PCT/US2011/055355, International Filing Date Oct. 7, 2011, 16 pages.
PCT/US2011/055411—WO/2012/057988—International Search Report—dated Mar. 12, 2012.
PCT/US2012/022945—WO/2012/109034—International Search Report—dated Sep. 25, 2012.
PCT/US2012/050561—WO/2013/025600—International Search Report and Written Opinion, dated Jan. 2, 2013, 13 pages.
PCT/US2012/050561—WO/2013/025600—International Preliminary Report on Patentability, dated Feb. 18, 2014, 9 pages.
PCT/US2014/035804—WO/2014/182499—International Search Report and Written Opinion, dated Aug. 19, 2014, 9 pages.
PCT/US2015/010056—WO2015105732—International Search Report and Written Opinion—dated Apr. 29, 2015.
CN101144025A, Office Action including Search Report, dated Feb. 28, 2015 (6 pages).
CN201280008458.0, Office Action dated Sep. 17, 2014 (8 pages).
CN201280008458.0, Office Action dated Apr. 29, 2015 (3 pages).
Adjaye et al., "Production of hydrocarbons by catalytic upgrading of a fast pyrolysis bio-oil. Part 1: Conversion over various catalysts", Fuel Processing Technology, vol. 45, pp. 161-183, 1995, 23 pages.
Adjaye et al., "Production of hydrocarbons by catalytic upgrading of a fast pyrolysis bio-oil. Part 2: Comparative catalytic performance and reaction pathways", Fuel Processing Technology, vol. 45, pp. 185-202, 1995, 18 pages.
Diebold et al., "Additives to Lower and Stabilize the Viscosity of Pyrolysis Oils during Storage", American Chemical Society Publications, National renewable Energy Laboratory, Golden Colorado, Energy Fuels, 1997, vol. 11, Issue 5, pp. 1081-1091, 3 pages, Abstract Only.
Chevron Diesel Technical Fuel Review 2007.
Chiaramonti et al., "Development of Emulsions from Biomass Pyrolysis Liquid and Diesel and Their use in Engines, Part 1: Emulsion Production", Biomass & Bioenergy, 25, 2003, 85-99.
Elliott et al., "Liquid Fuels by Low-Severity Hydrotreating of Biocrude", Developments in Thermochemical Biomass Conversion, vol. 1, pp. 611-621, A. V. Bridgwater and D. G. B. Boocock, eds., Blackie Academic & Professional, 1996, London, 11 pages.
Gerdes et al., "Alternatives from Wood and Cellulose, Precoat Filtration with Organic Filter Aids", J. Rettenmaier Benelux, Filtration & Separation, vol. 34, No. 10, ISSN 0015-1882, Dec. 1997, 6 pages.
Lehto et al.., "Fuel Oil Quality and Combustion of Fast Pyrolysis Bio-oils," Espoo 2013, VTT Technology 87, 84 pages.
Mohan et al., "Pyrolysis of Wood/Biomass for Bio-oil: A Critical Review", Energy & Fuels, 20, 2006, 848-889.
Pollard, "Comparison of Bio-Oil Produced in a Fractionated Bio-Oil Collection System", Graduate College, Iowa State University, 2009, 173 pages.

Sinnott, Chemical Engineering Design, vol. 6, $4^{th}$ Edition, Butterworth-Heinemann—an imprint of Elsevier, 2005, 1038 pages.
Song et al., "Effective Phase Separation of Biomass Pyrolysis Oils by Adding Aqueous Salt Solutions", Energy & Fuels, vol. 23, 2009, pp. 3307-3312.
U.S. Department of Energy, "Technical Information Exchange on Pyrolysis Oil: Potential for Renewable Heating Oil Substitution Fuel in New England," Workship Report: Pyrolysis Oil Technical Information Exchange Workship Summary Report, May 9-10, 2012, Manchester, New Hapshire, Engergestics Incorporated, Columbia, Maryland, Bioenergy Technologies Office, Washington, DC.
World Minerals, "Maximize Biodiesel Yields by Using Celite® Filter Aids, Filtration, Dewatering, Dewaxing and Winterization", Biodiesel, World Minerals Americas and World Headquarters, World Minerals Inc., Santa Barbara, California, USA, 2009, 4 pages.
PCT/US2014/048648—International Search Report and Written Opinion—mailed Dec. 3, 2014.
PCT/US2015/011160—International Search Report and Written Opinion—mailed Apr. 14, 2015.
European Application No. 12824005.8—European Search Report—mailed Nov. 19, 2015.
European Application No. 11836833.1—European Search Report—mailed Jul. 16, 2014.
Beis et al., "Fixed-bed pyrolysis of safflower seed: influence of pyrolysis parameters on product yields and compositions", Renewable Energy, Issue 26, 2002, pp. 21-32.
Li et al., "Analysis of upgrading of bio-petroleum from biomass by direct deoxy-liquefaction", Journal of Analytical and Applied Pyrolysis, Issue 81, 2008, pp. 199-204.
Ozbay et al., "Comparative analysis of pyrolysis oils and its subfractions under different atmospheric conditions", Fuel Processing Technology, Issue 87 2006, pp. 1013-1019.
Wang et al., "Comparative studies of products produced from four different bimass samples via deoxy-liquefaction", Bioresource Technology, Issue 99, 2008, pp. 2778-2786.
Bridgewater et al., "An Overview of Fast Pyrolysis of Biomass", Organic Geochemistry, 40, 1999, 1479-1493.
PCT/US2011/055355—WO/2012/057986—International Search Report and Written Opinion—dated Feb. 24, 2012.
PCT/US2011/055355—WO/2012/057986—International Preliminary Report on Patentability—dated Apr. 30, 2013.
Environmental Protection Agency, "National Emissions Inventory (NEI) Air Pollutant Emissions Trends Data", Technology Transfer Network, Clearinghouse for Emissions Inventories and Emissions Factors, Jun. 2012, 2 pages.
Fukuda et al., "The Effect of Fuel Aromatic Structure and Content on Direct Injection Diesel Engine Particulates", Society of Automotive Engineers, [Progress in Technology] PT; PT-11 (alternative Diesel Fuels), 2004, 259-270.
Graboski et al., "The Effect of Biodiesel Composition on Engine Emissions from a DDC Series 60 Diesel Engine", Final Report, Report 2 in a series of 6, Colorado Institute for Fuels and Engine Research, National Renewable Energy Laboratory, Technical Report, NREL/SR-510-31461, Feb. 2003.
Han et al., "Selecting Pour Depressants for Diesel Fuels", Chemistry and Technology of Fuels and Oils, Springer Science & Business Media, Inc., vol. 46, No. 5, 2010.
Huber et al., "Production of Liquid Alkanes by Aqueous-Phase Processing of Biomass-Derived Carbohydrates", ScienceMag.Org, vol. 308, Jun. 2005.
Ikura et al., "Emulsification of Pyrolysis Derived Bio-Oil in Diesel Fuel", Biomass & Bioenergy, Elsevier Science, Ltd., 24, 2003, 221-232.
IP Hydrocarbon Management, "HM 40 Guidelines for the crude oil washing of ships' tanks and the heating of crude oil being transported by sea", Energy Institute, London, 2nd Edition, Jun. 2004.
Liesenring, "Standard Specification for Diesel Fuel Oils", Designation: D975-11, ASTM International, Jan. 2012.
Trewella et al., "Renewable Fuel Co-Products—Potential Uses in Asphalt", PetroTech Consultants, LLC, 2012.
PCT/2015/010056—Written Opinion dated Apr. 13, 2015, filed Jan. 2, 2015, 17 pages.

\* cited by examiner

PRODUCTION OF RENEWABLE BIO-DISTILLATE

CROSS REFERENCE TO RELATED APPLICATIONS/INCORPORATION BY REFERENCE STATEMENT

This application is a Continuation-in-Part of, and claims the benefit of, co-pending U.S. application Ser. No. 13/533,432, filed Jun. 26, 2012, which is hereby incorporated by reference in its entirety herein. Co-pending U.S. application Ser. No. 13/533,432 is a continuation application of U.S. Ser. No. 12/915,872 filed on Oct. 29, 2010, which is also hereby incorporated by reference in its entirety herein. All publications and patents mentioned herein are hereby incorporated by reference in their entirety as if each individual publication or patent was specifically and individually indicated to be incorporated by reference.

BACKGROUND

1. Field of the Invention

The present invention relates generally to processes and systems for separating a bio-distillate fraction from a bio-oil. More specifically, the invention relates to the production of a renewable distillate including at least in part the bio-distillate fraction. An embodiment of the present invention also relates to processes for upgrading a bio-oil by use of a diluent and/or a recycle stream from the upgrading process to reduce fouling in upgrading equipment, such as a hydrodeoxygenation unit.

2. Description of the Related Art

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen which are difficult, if not impossible, to separate into various fractions. These bio-oils require extensive secondary upgrading in order to be utilized as transportation fuels and/or as fuel additives due to the high amounts of oxygen present in the bio-oil. Furthermore, these transportation fuels and/or fuel additives derived from bio-oil vary in quality depending on the original oxygen content of the bio-oil.

Accordingly, there is a need for an improved process and system for separating bio-oil into various fractions such as bio-distillate, and using such fractions as blend components of renewable fuels.

Further, although bio-oil obtained from biomass catalytic pyrolysis is more stable than thermal pyrolysis oils, it is still generally less stable than petroleum derived hydrocarbons. This instability is associated with bimolecular reactions, such as condensation and/or polymerization reactions, of oxygen-containing compounds. At the typical elevated reactor temperatures of hydrotreating units (such as 300-500° C.), these instability reactions become more pronounced resulting in heavier compounds which create deposits in both the hydrotreating feed pre-heater and in the hydrotreater unit. In order to minimize such fouling in commercial operations, the preheater and hydrotreater temperatures are kept as low as possible while still sufficiently high to provide effective hydrodeoxygenation. However, even with such temperature control there is still significant fouling requiring frequent and costly unit shutdowns for deposit removal, hydrotreating catalyst regeneration, and/or hydrotreating catalyst replacement. Accordingly, there remains a need for an improved process for upgrading bio-oil which reduces fouling of the upgrading equipment.

SUMMARY OF THE INVENTION

In one embodiment, the present invention is directed to a bio-distillate fraction production process comprising (a) converting biomass in a conversion reactor containing a catalyst to thereby produce a conversion reactor effluent comprising vapor conversion products; (b) condensing at least portion of the vapor conversion products to thereby provide a bio-oil having a total oxygen content of less than about 15 weight percent; and (c) separating a bio-distillate fraction from the bio-oil, wherein at least about 75 weight percent of the bio-distillate fraction has a boiling point between about 180° C. and about 380° C., and wherein the bio-distillate fraction comprises at least about 50 or 40 weight percent oxygen-free hydrocarbons.

In another embodiment, the present invention is directed to a renewable distillate production process comprising: (a) separating a bio-oil into at least a bio-distillate fraction, wherein at least about 75 weight percent of the bio-distillate fraction has a boiling point between about 180° C. and about 380° C., wherein the bio-oil has not previously been subjected to an oxygen-removing hydrotreatment step; and (b) combining at least a portion of the bio-distillate fraction with a petroleum-derived-distillate-range stream, and a stabilizing additive having surfactant properties, to thereby produce a renewable distillate having a single clear phase, wherein the renewable distillate comprises the petroleum-derived-distillate-range stream in an amount of between about 5 weight percent and about 99 weight percent, the bio-distillate fraction in an amount of at least about 0.5 weight percent, and the stabilizing additive in an amount between about 0.5 and about 25 weight percent.

In a further embodiment, the present invention is directed to a bio-distillate fraction having a total oxygen content of less than about 15 weight percent, wherein at least about 75 weight percent of the bio-distillate fraction has a boiling point between about 180° C. and about 380° C., and the bio-distillate fraction comprises at least about 50 or 40 weight percent oxygen-free hydrocarbons.

In a further embodiment, the present invention is directed to a renewable distillate composition comprising a petroleum-derived-distillate-range stream in an amount of between about 5 weight percent and about 99 weight percent, a bio-distillate fraction in an amount of at least about 0.5 weight percent, and a stabilizing additive having surfactant properties in an amount between about 0.5 and about 25 weight percent.

In a further embodiment, the present invention is directed to a process for upgrading bio-oil comprising:
a) combining a bio-oil comprising oxygenated hydrocarbons and having a total oxygen content greater than about 5 wt % with a diluent thereby forming a feed stream;
b) charging the feed stream to a preheater and heating the feed stream to a temperature in the range of from about 20 to about 450° C. in the preheater thereby forming a heated feed stream;
c) charging the heated feed stream to a hydrodeoxygenation unit operated at a temperature in the range of from about 300 to about 500° C. wherein at least a portion of the oxygen is removed from the oxygenated hydrocarbons of the bio-oil thereby forming an effluent stream comprising the diluent, water, and an at least partially upgraded bio-oil; and
d) separating at least a portion of the at least partially upgraded bio-oil from the effluent stream thereby forming a product stream comprising the at least partially upgraded bio-oil having a total oxygen content lower than the total oxygen content of the bio-oil.

In a further embodiment, the present invention is directed to a process for upgrading bio-oil comprising:
a) combining a bio-oil comprising oxygenated hydrocarbons and having a total oxygen content greater than about 5 wt % with a diluent comprising a recycle stream thereby forming a feed stream;
b) charging the feed stream to a preheater and heating the feed stream to a temperature in the range of from about 20 to about 450° C. in the preheater thereby forming a heated feed stream;
c) charging the heated feed stream to a hydrodeoxygenation unit comprising at least two stages and operated at a temperature in the range of from about 300 to about 500° C. wherein at least a portion of the oxygen is removed from the oxygenated hydrocarbons of the bio-oil thereby forming at least one inter-stage stream comprising partially hydrodeoxygenated bio-oil and an effluent stream comprising the diluent, water, and an at least partially upgraded bio-oil;
d) separating at least a portion of the at least partially upgraded bio-oil from the effluent stream thereby forming a product stream comprising the at least partially upgraded bio-oil having a total oxygen content lower than the total oxygen content of the bio-oil, wherein the at least one inter-stage stream and the product stream are each at a higher temperature than the bio-oil; and
e) utilizing as the recycle stream a portion of at least one of: i) the at least one inter-stage stream, and ii) the product stream.

In a further embodiment, the present invention is directed to a process for upgrading bio-oil comprising:
a) combining a bio-oil comprising oxygenated hydrocarbons and having a total oxygen content greater than about 5 wt % with a diluent thereby forming a first feed stream;
b) charging the first feed stream to a preheater and heating the first feed stream to a temperature in the range of from about 20 to about 100° C. in the preheater thereby forming a heated first feed stream;
c) combining a recycle stream having a temperature of from about 100 to about 460° C. with the heated first feed stream thereby forming a second feed stream having a temperature in the range of from about 20 to about 450° C.;
d) charging the second feed stream to a hydrodeoxygenation unit comprising at least two stages and operated at a temperature in the range of from about 300 to about 500° C. wherein at least a portion of the oxygen is removed from the oxygenated hydrocarbons of the bio-oil thereby forming at least one inter-stage stream comprising partially hydrodeoxygenated bio-oil and an effluent stream comprising the diluent, water, and an at least partially upgraded bio-oil;
e) separating at least a portion of the at least partially upgraded bio-oil from the effluent stream thereby forming a product stream comprising the at least partially upgraded bio-oil having a total oxygen content lower than the total oxygen content of the bio-oil, wherein the at least one inter-stage stream and the product stream are each at a higher temperature than the bio-oil; and
f) utilizing as the recycle stream a portion of at least one of: i) the at least one inter-stage stream, and ii) the product stream.

In a further embodiment, the present invention is directed to a process for upgrading bio-oil comprising:
a) combining a bio-oil comprising oxygenated hydrocarbons and having a total oxygen content greater than about 5 wt % with a diluent thereby forming a feed stream;
b) charging a portion of the feed stream as a preheater feed stream to a preheater and heating the preheater feed stream to a temperature in the range of from about 20 to about 450° C. in the preheater thereby forming a heated feed stream;
c) charging the heated feed stream to a hydrodeoxygenation unit comprising at least two stages and operated at a temperature in the range of from about 300 to about 500° C. wherein at least a portion of the oxygen is removed from the oxygenated hydrocarbons of the bio-oil thereby forming at least one inter-stage stream comprising partially hydrodeoxygenated bio-oil and an effluent stream comprising the diluent, water, and an at least partially upgraded bio-oil;
d) charging a portion of the feed stream as a quench to at least one of the inter-stage streams to thereby form a quenched inter-stage stream and control the temperature of the downstream stages; and
e) separating at least a portion of the at least partially upgraded bio-oil from the effluent stream thereby forming a product stream comprising the at least partially upgraded bio-oil having a total oxygen content lower than the total oxygen content of the bio-oil.

DETAILED DESCRIPTION

Figure 1:
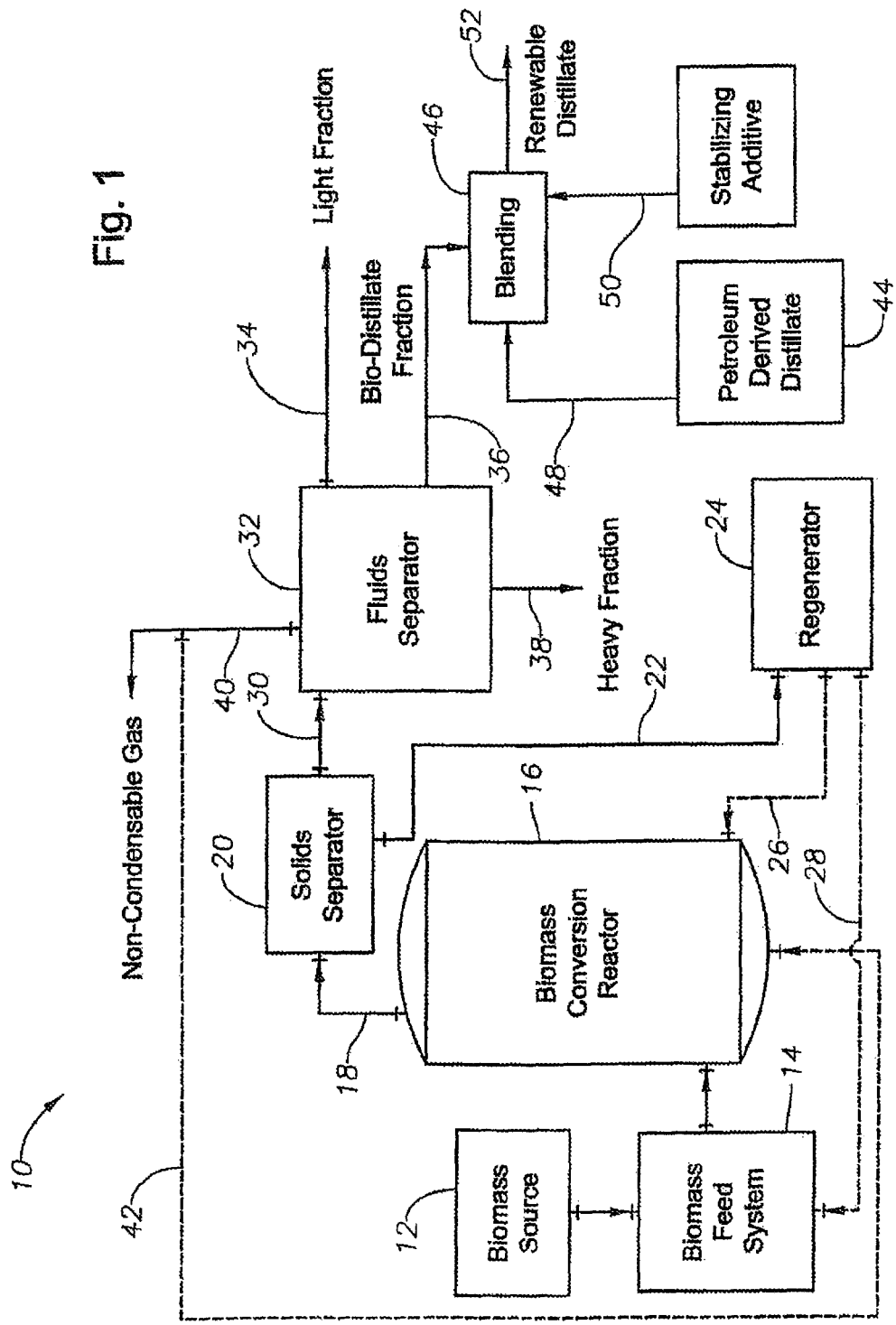
FIG. 1 is a schematic diagram of a biomass conversion system according to one embodiment of the present invention.

FIG. 1 depicts a biomass conversion system 10 that includes a means for separating bio-oil into various fractions or fuel additives and blending the bio-distillate fraction with a petroleum-derived-distillate-range stream, as a blend stock or fuel additive, to form renewable distillate.

It should be understood that the biomass conversion system shown in FIG. 1 is just one example of a system within which the present invention can be embodied. The present invention may find application in a wide variety of other systems where it is desirable to efficiently and effectively separate bio-oil into renewable fuels and/or fuel additives. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, mordenite, beta, ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material.

The biomass feed system 14 introduces the biomass feedstock into a biomass conversion reactor 16. In the biomass conversion reactor 16, biomass is subjected to a conversion reaction that produces bio-oil. The biomass conversion reactor 16 can facilitate different chemical conversion reactions such as fast pyrolysis, slow pyrolysis, liquefaction, gasification, or enzymatic conversion. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be fast pyrolysis. More specifically, fast pyrolysis may include catalytic cracking. As used herein, "pyrolysis" refers to the thermochemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, non-condensable gases recycled from the biomass conversion process, and/or any combination thereof.

Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In one embodiment of the present invention, the conversion reaction carried out in the biomass conversion reactor 16 produces a bio-oil. Such bio-oil can have an oxygen content that is less than 15, 12, 10, or 8 percent by weight of the bio-oil. The oxygen content can also be greater than about 0.5, 1, 3, or 5 percent by weight of the bio-oil.

When fast pyrolysis is carried out in the biomass conversion reactor 16, the conversion effluent 18 generally comprises solid particles of char, ash, and/or spent catalyst. The conversion effluent 18 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The substantially solids-free fluid stream 30, also referred to as bio-oil, exiting the solids separator 20 can then be introduced into a fluids separator 32. In one embodiment, it is preferred that the bio-oil 30 entering the fluids separator 32 has not previously been subjected to a deoxygenation process such as, for example, hydrotreating. The fluids separator 32 can be any system capable of separating the bio-oil 30 into at least a light fraction 34, a bio-distillate fraction 36, and a heavy fraction 38. Suitable systems to be used as the fluids separator 32 include, for example, systems for affecting separation by fractional distillation, heated distillation, extraction, membrane separation, partial condensation, and/or non-heated distillation. In some cases, it may be preferred to employ heated distillation to affect separation, where such heated distillation raises the temperature of the bio-oil 30 above 100° C. As shown in FIG. 1, non-condensable gases 40 may be removed from the fluids separator 32 and, optionally, recycled via line 42 to the biomass conversion reactor 16 for use as a lift gas.

The light fraction 34 exiting fluids separator 32 can have a boiling range comparable to petroleum-derived gasoline. The bio-distillate fraction 36 exiting fluids separator 32 can have a boiling range comparable to petroleum-derived distillates.

The boiling range of the bio-distillate fraction 36 can be such that at least 75, 85, 95, or 100 weight percent of the bio-distillate fraction 36 boils at a temperature between about 180° C. and about 380° C., between about 190° C. and about 370° C., or between about 205° C. and about 355° C. The boiling range of the heavy fraction 38 can be such that at least 75, 85, 95, or 100 weight percent of the heavy fraction 38 boils at a temperature greater than 380° C., 370° C., or 355° C. The boiling range of the light fraction 34 can be such that at least 75, 85, 95, or 100 weight percent of the light fraction 34 boils at a temperature less than about 205° C., 190° C., or 180° C.

In one embodiment, at least 5, 15, 25, or 35 weight percent of the bio-oil 30 entering the fluids separator 32 is separated into the bio-distillate fraction 36. In another embodiment at least 10, 20, or 30 weight percent of the bio-oil 30 entering the fluids separator 32 is separated into the light fraction 34, and less than 60 weight percent of the bio-oil 30 subjected to separation is separated into the heavy fraction 38.

Bio-Distillate Fraction/Composition

The bio-distillate fraction 36 can have an oxygen content that is less than 15, 12, 10, 8 and/or greater than about 0.5, 1, or 4 weight percent. The bio-distillate fraction, which can also be referred to as a bio-distillate composition, can comprise at least about 40 or 50 weight percent oxygen-free hydrocarbons, and can have less than about 1 or 0.5 weight percent carbonyls, and can have less than about 0.5 or 0.2 weight percent carboxylic acid.

The bio-distillate fraction can have less than about 0.5 or less than about 0.2 weight percent aldehydes, and can further comprise between about 10 and about 40, or between about 20 and about 40 weight percent oxygen-and-carbon-containing compounds. The oxygen-and-carbon-containing compounds can be selected from the group consisting of phenolics, furans, ketones, aldehydes, and mixtures thereof.

The bio-distillate fraction/composition preferably has a copper corrosion test value of less than No. 3.

Renewable Distillate

As illustrated in FIG. 1, biomass production system 10 can be located near or connected by a transportation system with a petroleum-derived distillate source 44. Petroleum-derived distillate source 44 can be, for example, a petroleum refinery, a petroleum fuel storage facility, and/or a petroleum fuel transportation system.

A distillate blending system 46 can be used to combine a petroleum-derived distillate-range stream 48, which can have between 12 and 25 carbon atoms per molecule, from petroleum-derived distillate source 44 with at least a portion of the bio-distillate fraction 36 and a stabilizing additive 50 to thereby produce a renewable distillate composition 52 having a single clear phase.

The renewable distillate composition can comprise the petroleum-derived-distillate-range stream 48 in an amount of at least 5, 15, or 25 weight percent and/or at most 99, 98, or 96 weight percent; the bio-distillate fraction 36 in an amount of at least 0.5, 2, 5, 25, or 60 weight percent, and the stabilizing additive having surfactant properties in an amount between about 0.5 and about 25 weight percent.

The stabilizing additive can comprise a material selected from the group consisting of: 1) a non-ionic block-copolymer having a Hydrophile-Lipophile Balance (HLB) of at most eight, seven, or six and/or at least two or three; 2) a non-ionic homopolymer having an HLB of at most eight, seven, or six and/or at least two or three, 3) a mixture of a non-ionic block-copolymer and a non-ionic homopolymer having an average HLB of at most eight, seven, or six and/or at least two or three; 4) a non-ionic surfactant having an HLB of at most eight, seven, or six and/or at least two or three, 5) a Fatty Acid Methyl Ester (FAME), or 6) a combination thereof. Examples of stabilizing additives include, but are not limited to, Hypermer series polymers, Brij series surfactants, Propylene Glycol Isostereate, Span series surfactants, Glycol Stearate, Sorbitan Sesquioleate, Glyceryl Stearate, Lecithin series surfactants, Sorbitan Oleate, Sorbitan Monostearate NF, Sorbitan Stearate, Sorbitan Iso stearate, Steareth-2, Oleth-2, Glyceryl Laurate, Ceteth-2, PEG series polymer surfactants, Dipolyhydroxystearate, Glyceryl Stearate SE, Methyl Glucose Sesquistearate, Atsurf series surfactants, and mixtures thereof.

Among other choices, the petroleum-derived-distillate-range stream can be selected from the group consisting of a regular distillate, low sulfur distillate, hydroprocessed light cycle oil, hydrotreated straight run gas oil, ultra low sulfur distillate, refinery processed middle distillate, or mixtures thereof.

In cases wherein the stabilizing additive which is used comprises non-ionic surfactant, non-ionic block-copolymer, or non-ionic homopolymer, or a mixture of non-ionic block-copolymer and the non-ionic homopolymer; for ease of processing it is preferred to either simultaneously or sequentially add the stabilizing additive and the bio-distillate fraction to the petroleum-derived-distillate-range stream, thereby forming the renewable distillate.

In cases wherein the stabilizing additive comprises a FAME; it has been discovered that a significant operational advantage is achieved by combining the bio-distillate fraction with the stabilizing additive prior to combination of the two components with the petroleum-derived-distillate-range stream, thereby forming the renewable distillate.

Bio-Oil Upgrading

FIGS. 2-5 depict bio-oil upgrading systems that each include a preheater, a hydrodeoxygenation unit and a product separator.

It should be understood that the bio-oil upgrading systems shown in FIGS. 2-5 are just examples and embodiments of systems within which the present invention can be embodied. The present invention may find application in a wide variety of other systems where it is desirable to efficiently and effectively upgrade bio-oil.

The bio-oil useful in the following embodiments can comprise oxygenated hydrocarbons and can have a total oxygen content greater than about 5, or greater than about 8, or greater than about 10 wt %.

The hydrodeoxygenation unit useful in the following embodiments can be operated at a temperature in the range of from about 300 to about 500° C., or from about 320 to about 450° C., or from about 350 to about 420° C.

Figure 2:
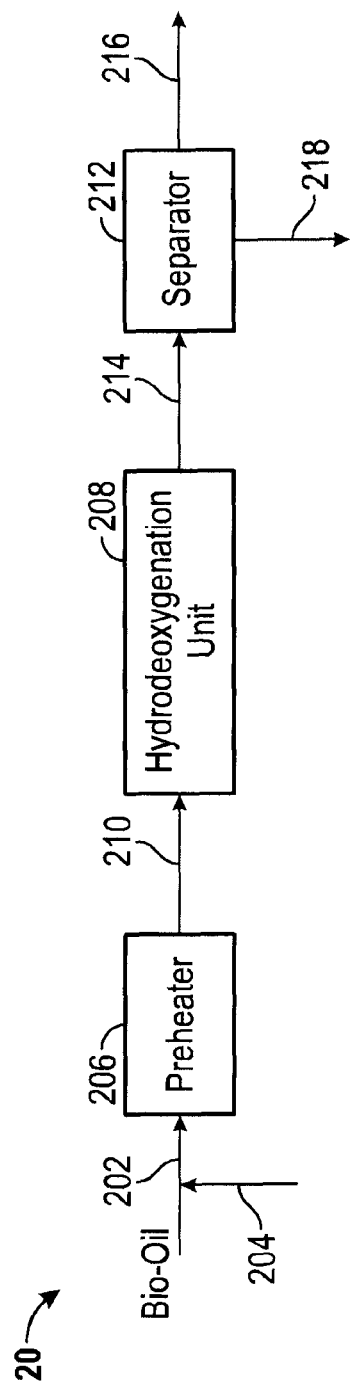
FIG. 2 is a schematic diagram of a bio-oil upgrading system according to one embodiment of the present invention.

In accordance with the bio-oil upgrading system 20 of FIG. 2, the bio-oil is combined with a diluent via lines 202 and 204 thereby forming a feed stream. The feed stream is charged to a preheater 206 via line 202 wherein the feed stream is heated to a temperature in the range of from about 20 to about 450° C., or from about 80 to about 430° C., or from about 100 to about 400° C.; thereby forming a heated feed stream.

The heated feed stream is charged to a hydrodeoxygenation unit 208 via line 210 wherein at least a portion of the oxygen is removed from the oxygenated hydrocarbons of the bio-oil thereby forming an effluent stream comprising the diluent, water, and an at least partially upgraded bio-oil. The effluent stream is charged to a separator 212 via line 214 wherein at least a portion of the at least partially upgraded bio-oil is separated from the effluent stream thereby forming a product stream 216 comprising the at least partially upgraded bio-oil having a total oxygen content lower than the total oxygen content of the bio-oil. The at least partially upgraded bio-oil can have a total oxygen content less than about 15, or less than about 10, or less than about 8, or less than about 6, or less than about 4 wt %. The product stream can further comprise at least a portion of the diluent. A water-containing stream is also formed and removed from separator 212 via line 218.

A portion of the oxygenated hydrocarbons in the feed stream 202 react with each other in the preheater 206 or the hydrodeoxygenation unit 208 or both the preheater 206 and the hydrodeoxygenation unit 208 forming heavier compounds which are deposited in the preheater 206 or the hydrodeoxygenation unit 208 or both the preheater 206 and the hydrodeoxygenation unit 208. Further, the total amount of heavier compounds deposited in the preheater 206 and in the hydrodeoxygenation unit 208 is less than the total amount of heavier compounds deposited in the preheater 206 and the hydrodeoxygenation unit 208 when the feed stream 202 does not contain the diluent. In addition, the diluent provides dilution of the bio-oil in the preheater 206 and the hydrodeoxygenation unit 208 which slows the reaction of the oxygenated hydrocarbons in the feed stream 202 with each other, minimizing or preventing buildup of carbonaceous deposits in the preheater 206 or in the hydrodeoxygenation unit 208 or both the preheater 206 and the hydrodeoxygenation unit 208.

The diluent can be present in the feed stream 202 in an amount of about 0.5 to about 50, or from about 2 to about 45, or from about 5 to about 40 wt %. The diluent can be any material capable of serving as a diluent for a bio-oil feed. More particularly, the diluent can be a renewable diluent selected from the group consisting of a fatty acid methyl ester (FAME), biodiesel, biomass-derived diesel, a recycled portion of the at least partially upgraded bio-oil described above, and combinations thereof.

The temperature of the upgraded bio-oil is generally higher than the temperature of the bio-oil. When the diluent comprises a FAME and a portion of the at least partially upgraded bio-oil, the inclusion of the at least partially upgraded bio-oil in the feed stream 202 provides heat to the feed stream 202 thereby reducing the required heat duty of the preheater 206, reducing the heated surface temperatures of the preheater 206, and slowing the reaction of the oxygenated hydrocarbons in the feed stream 202 with each other minimizing or preventing buildup of carbonaceous deposits in the preheater 206 or the hydrodeoxygenation unit 208 or both the preheater 206 and the hydrodeoxygenation unit 208.

Figure 3:
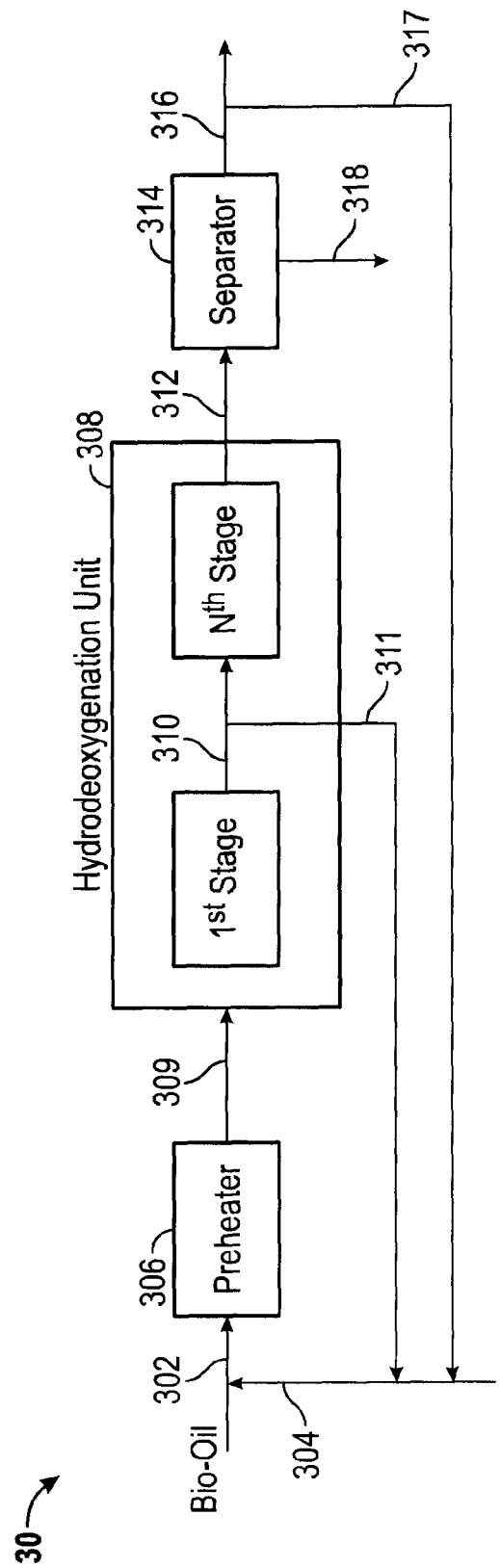
FIG. 3 is a schematic diagram of a bio-oil upgrading system according to one embodiment of the present invention.

In accordance with the bio-oil upgrading system 30 of FIG. 3, the bio-oil is combined with a diluent via lines 302 and 304 thereby forming a feed stream. The diluent can be present in the feed stream 302 in an amount of about 0.5 to about 50, or from about 2 to about 45, or from about 5 to about 40 wt %.

The feed stream is charged to a preheater 306 via line 302 wherein the feed stream is heated to a temperature in the range of from about 20 to about 450° C., or from about 80 to about 430° C., or from about 100 to about 400° C.; thereby forming a heated feed stream. The heated feed stream is charged to a hydrodeoxygenation unit 308 comprising at least two stages via line 309 wherein at least a portion of the oxygen is removed from the oxygenated hydrocarbons of the bio-oil thereby forming at least one inter-stage stream represented by line 310 comprising partially hydrodeoxygenated bio-oil and an effluent stream 312 comprising the diluent, water, and an at least partially upgraded bio-oil. The at least partially upgraded bio-oil can have a total oxygen content less than about 15, or less than about 10, or less than about 8, or less than about 6, or less than about 4 wt %. The effluent stream is charged to a separator 314 wherein at least a portion of the at least partially upgraded bio-oil is separated from the effluent stream thereby forming a product stream 316 comprising the at least partially upgraded bio-oil having a total oxygen content lower than the total oxygen content of the bio-oil, wherein the at least one inter-stage stream 310 and the product stream 316 are each at a higher temperature than the bio-oil. The product stream can further comprise at least a portion of the diluent. A water-containing stream is also formed and removed from separator 314 via line 318.

Also, a portion of at least one of: i) the at least one inter-stage stream 310, and ii) the product stream 316 are recycled via lines 310, 311, and 316, 317, respectively, to become at least a part of the diluent combined with the bio-oil via line 304.

The diluent can further comprise any material capable of serving as a diluent for a bio-oil feed. More particularly, the diluent can further comprise a component selected from the group consisting of a fatty acid methyl ester (FAME), biodiesel, biomass-derived diesel, and combinations thereof.

A portion of the oxygenated hydrocarbons react with each other in the preheater 306 or the hydrodeoxygenation unit 308 or both the preheater 306 and the hydrodeoxygenation unit 308 forming heavier compounds which are deposited in the preheater 306 or the hydrodeoxygenation unit 308 or both the preheater 306 and the hydrodeoxygenation unit 308. Further, the total amount of heavier compounds deposited in the preheater 306 and the hydrodeoxygenation unit 308 is less than the total amount of heavier compounds deposited in the preheater 306 and the hydrodeoxygenation unit 308 when the feed stream 302 does not contain the diluent. In addition, the diluent provides dilution of the bio-oil in the preheater 306 and the hydrodeoxygenation unit 308 which slows the reaction of the oxygenated hydrocarbons in the feed stream 302 with each other minimizing or preventing buildup of carbonaceous deposits in the preheater 306 or the hydrodeoxygenation unit 308 or both the preheater 306 and the hydrodeoxygenation unit 308.

The inclusion of the recycle stream in the feed stream 302 provides heat to the feed stream 302 thereby reducing the required heat duty of the preheater 306, reducing the heated surface temperatures of the preheater 306, and slowing the reaction of the oxygenated hydrocarbons in the feed stream 302 with each other minimizing or preventing buildup of carbonaceous deposits in the preheater 306 or the hydrodeoxygenation unit 308 or both the preheater 306 and the hydrodeoxygenation unit 308.

Figure 4:
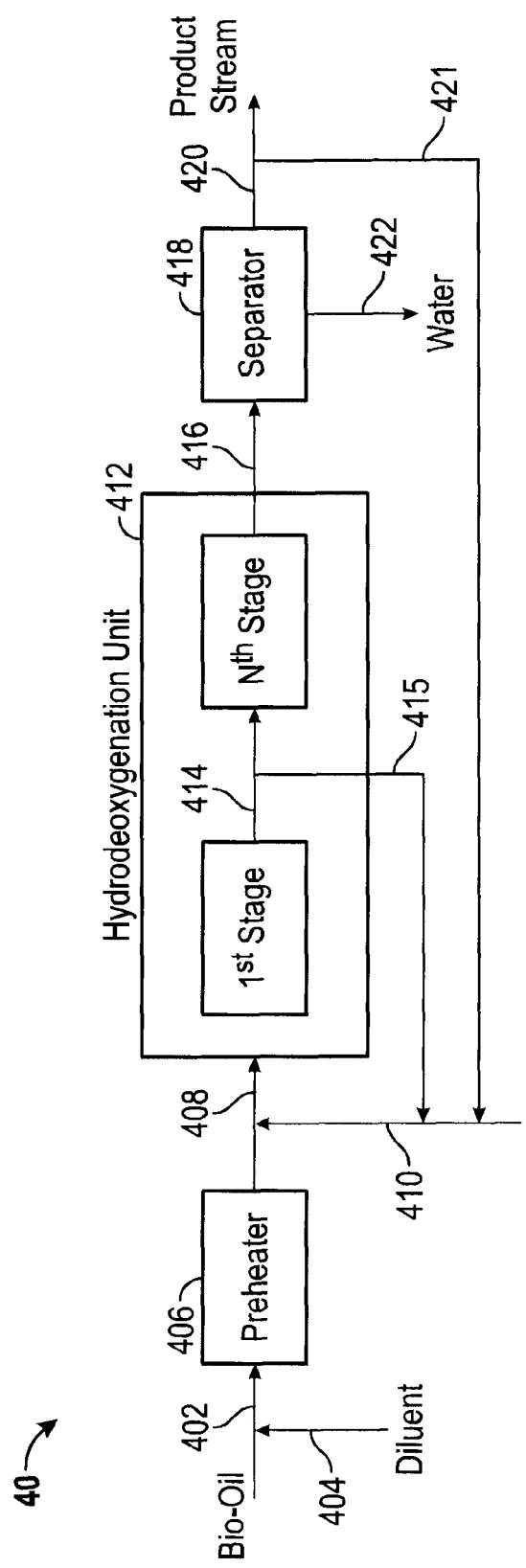
FIG. 4 is a schematic diagram of a bio-oil upgrading system according to one embodiment of the present invention.

In accordance with the bio-oil upgrading system 40 of FIG. 4, the bio-oil is combined with a diluent via lines 402 and 404 thereby forming a first feed stream. The first feed stream is charged to a preheater 406 via line 402 and is heated to a temperature in the range of from about 20 to about 100, or from about 30 to about 90, or from about 40 to about 80° C., thereby forming a heated first feed stream. A recycle stream is combined with the heated first feed stream via lines 408 and 410 thereby forming a second feed stream having a temperature in the range of from about 20 to about 450° C., or from about 80 to about 430° C., or from about 100 to about 400° C. The recycle stream can have a temperature of from about 100 to about 460, or from about 200 to about 430, or from about 250 to about 420° C.

The second feed stream is charged to a hydrodeoxygenation unit 412 comprising at least two stages via line 408 wherein at least a portion of the oxygen is removed from the oxygenated hydrocarbons of the bio-oil thereby forming at least one inter-stage stream represented by line 414 comprising partially hydrodeoxygenated bio-oil and an effluent stream 416 comprising the diluent, water, and an at least partially upgraded bio-oil. The at least partially upgraded bio-oil can have a total oxygen content less than about 15, or less than about 10, or less than about 8, or less than about 6, or less than about 4 wt %.

The effluent stream 416 is charged to a separator 418 wherein at least a portion of the at least partially upgraded bio-oil is separated from the effluent stream 416 thereby forming a product stream 420 comprising the at least partially upgraded bio-oil having a total oxygen content lower than the total oxygen content of the bio-oil. The product stream 420 can further comprise at least a portion of the diluent. A water-containing stream is also formed and removed from separator 418 via line 422. The at least one inter-stage stream 414 and the product stream 420 are each at a higher temperature than the bio-oil.

Also, a portion of at least one of: i) the at least one inter-stage stream 414, and ii) the product stream 420 are recycled via lines 414, 415, and 420, 421, respectively, as the recycle stream for combination with the heated first feed stream via line 410 thereby forming the second feed stream.

The preheater 406 provides from greater than 0 to about 30, or from greater than about 5 to about 25% of the heat needed to raise the temperature of the second feed stream to a temperature in the range of from about 20 to about 450, or from about 80 to about 430, or from about 100 to about 400° C.

The diluent can be any material capable of serving as a diluent for a bio-oil feed. More particularly, the diluent can comprise a component selected from the group consisting of a fatty acid methyl ester (FAME), biodiesel, biomass-derived diesel, and combinations thereof.

A portion of the oxygenated hydrocarbons react with each other in the preheater 406 or the hydrodeoxygenation unit 412 or both the preheater 406 and the hydrodeoxygenation unit 412 forming heavier compounds which are deposited in the preheater 406 or the hydrodeoxygenation unit 412 or both the preheater 406 and the hydrodeoxygenation unit 412. Further, the total amount of heavier compounds deposited in the preheater 406 and the hydrodeoxygenation unit 412 is less than the total amount of heavier compounds deposited in the preheater 406 and the hydrodeoxygenation unit 412 when the diluent and the recycle stream are not combined with the bio-oil. In addition, the diluent provides dilution of the bio-oil in the hydrodeoxygenation unit 412, and in the preheater 406, which slows the reaction of the oxygenated hydrocarbons with each other minimizing or preventing buildup of carbonaceous deposits in the preheater 406 or the hydrodeoxygenation unit 412 or both the preheater 406 and the hydrodeoxygenation unit 412.

The combination of the recycle stream with the heated first feed stream provides heat to the second feed stream thereby reducing the required heat duty of the preheater 406, reducing the heated surface temperatures of the preheater 406, and slowing the reaction of the oxygenated hydrocarbons with each other minimizing or preventing buildup of carbonaceous deposits in the preheater 406 or the hydrodeoxygenation unit 412 or both the preheater 406 and the hydrodeoxygenation unit 412.

The combined total of the diluent and the recycle stream in the second feed stream can be from about 0.5 to about 50, or from about 2 to about 45, or from about 5 to about 40 wt %.

Figure 5:
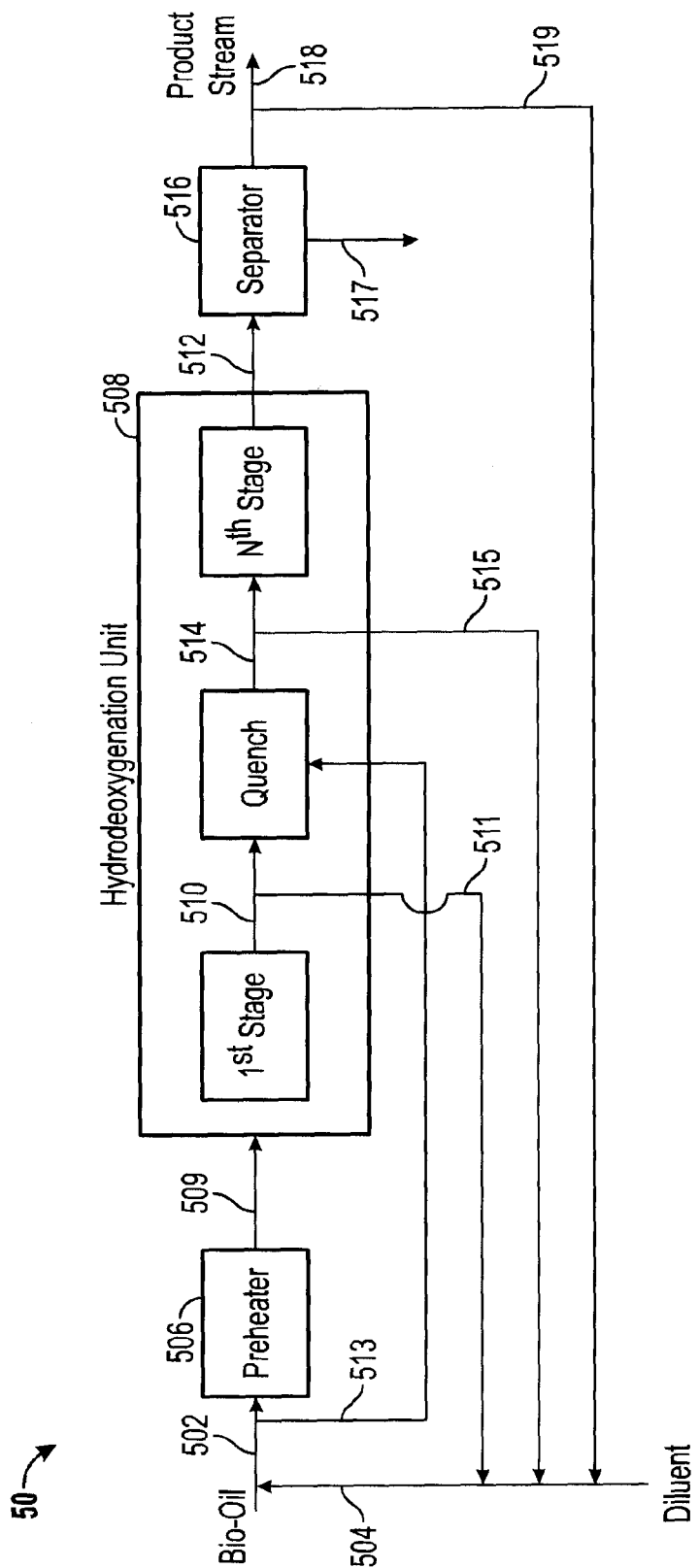
FIG. 5 is a schematic diagram of a bio-oil upgrading system according to one embodiment of the present invention.

In accordance with the bio-oil upgrading system 50 of FIG. 5, the bio-oil is combined with a diluent via lines 502 and 504 thereby forming a feed stream. A portion of the feed stream is charged as a preheater feed stream to a preheater 506 and heated to a temperature in the range of from about 20 to about 450° C., or from about 80 to about 430° C., or from about 100 to about 400° C. in the preheater 506 thereby forming a heated feed stream.

The heated feed stream is charged to a hydrodeoxygenation unit 508 comprising at least two stages via line 509 wherein at least a portion of the oxygen is removed from the oxygenated hydrocarbons of the bio-oil thereby forming at least one inter-stage stream represented by line 510 comprising partially hydrodeoxygenated bio-oil and an effluent stream 512 comprising the diluent, water, and an at least partially upgraded bio-oil. The at least partially upgraded bio-oil can have a total oxygen content less than about 15, or less than about 10, or less than about 8, or less than about 6, or less than about 4 wt %.

A portion of the feed stream is also charged via line 513 as a quench to at least one of the inter-stage streams 510 to thereby form a quenched inter-stage stream(s) represented by line 514 which can control the temperature of the downstream stages.

The effluent stream 512 is charged to a separator 516 wherein at least a portion of the at least partially upgraded bio-oil is separated from the effluent stream 512 thereby forming a product stream 518 comprising the at least partially upgraded bio-oil having a total oxygen content lower than the total oxygen content of the bio-oil.

The product stream can further comprise at least a portion of the diluent. A water-containing stream is also formed and removed from separator 516 via line 517.

A portion of the oxygenated hydrocarbons react with each other in the preheater 506 or the hydrodeoxygenation unit 508 or both the preheater 506 and the hydrodeoxygenation unit 508 forming heavier compounds which are deposited in the preheater 506 or the hydrodeoxygenation unit 508 or both the preheater 506 and the hydrodeoxygenation unit 508. Further, the total amount of heavier compounds deposited in the preheater 506 and in the hydrodeoxygenation unit 508 is less than the total amount of heavier compounds deposited in the preheater 506 and the hydrodeoxygenation unit 508 when the feed stream does not contain the diluent.

In addition, the diluent provides dilution of the bio-oil in the preheater 506 and the hydrodeoxygenation unit 508 which slows the reaction of the oxygenated hydrocarbons in the feed stream with each other minimizing or preventing buildup of carbonaceous deposits in the preheater 506 or the hydrodeoxygenation unit 508 or both the preheater 506 and the hydrodeoxygenation unit 508.

The diluent can be present in the feed stream in an amount of about 0.5 to about 50, or from about 2 to about 45, or from about 5 to about 40 wt %. The diluent can be any material capable of serving as a diluent for a bio-oil feed. More particularly, the diluent can be a renewable diluent selected from the group consisting of a fatty acid methyl ester (FAME), biodiesel, biomass-derived diesel, a recycle stream selected from the group consisting of: i) at least one of the inter-stage streams 510, ii) at least one of the quenched inter-stage streams 514, and iii) the product stream 518, and combinations thereof. Also, the temperature of the recycle stream is higher than the temperature of the bio-oil. The at least one inter-stage stream 510 can be recycled for use as at least a portion of the diluent via lines 510 and 511. The at least one quenched inter-stage stream 514 can be recycled for use as at least a portion of the diluent via lines 514 and 515. The product stream 518 can be recycled for use as at least a portion of the diluent via lines 518 and 519.

When the diluent comprises a FAME and the recycle stream, the inclusion of the recycle stream in the diluent provides heat to the feed stream thereby reducing the required heat duty of the preheater, reducing the heated surface temperatures of the preheater, and slowing the reaction of the oxygenated hydrocarbons with each other in the feed stream minimizing or preventing buildup of carbonaceous deposits in the preheater 506 or the hydrodeoxygenation unit 508 or both the preheater 506 and the hydrodeoxygenation unit 508.

EXAMPLES

Example 1

A low oxygen bio-oil was produced from the conversion of southern yellow pine wood particles by pyrolysis in the presence of a catalyst in a riser reactor operated at a reactor outlet temperature of about 650° C. The resulting bio-oil had an oxygen content of about 12 weight percent, and was distilled to yield more than 25 weight percent of a bio-diesel fraction boiling in the range of less than about 345° C. The composition of the bio-distillate fraction is shown below in Table 1.

TABLE 1

| | wt % in bio-distillate |
|---|---|
| Cyclics/Aromatics | |
| Cyclic dienes | 0.00 |
| BTEX | 0.46 |
| Other 1-Ring Aromatics | 0.12 |
| Indanes/Indenes | 6.45 |
| Naphthalenes | 53.07 |
| 3-Ring | 2.60 |
| 4-Ring | 0.00 |

TABLE 1-continued

| | wt % in bio-distillate |
|---|---|
| 5-Ring | 0.00 |
| 6-Ring | 0.00 |
| Total | 62.70 |
| Nitrogen Compounds | |
| Indazoles | 0.00 |
| Oxygenates | |
| Alcohols | 0.00 |
| Ethers | 0.98 |
| Carboxylic Acids | 0.00 |
| Aldehydes | 0.00 |
| Ketones | 0.32 |
| Phenols | 7.96 |
| Diols | 7.72 |
| Indenols | 3.09 |
| BenzoFurans | 3.86 |
| Naphthols | 13.37 |
| Levoglucosan | 0.00 |
| Total | 37.30 |
| Total [0] (%) | 11.21 |

As can be seen from the data, the bio-distillate fraction is of high quality, having a low oxygen content, undetectable carboxylic acids, and significant amounts of cyclic/aromatics.

Example 2

A quantity of Hypermer B241 polymer was blended with commercially available Ultra Low Sulfur Diesel (ULSD) to form a first mixture, which was then combined with a quantity of the bio-distillate fraction from Example 1 to form a renewable distillate blend containing 97 weight percent ULSD, 1 weight percent Hypermer B241, and 2 weight percent bio-distillate. Following mixing using an ultra sonic homogenizer, the renewable distillate blend was a single clear phase.

Example 3

Different quantities of a FAME were blended with quantities of the bio-distillate fraction from Example 1 to form mixtures, which were then combined with quantities of ULSD to form renewable distillate blends which were mixed with an ultra sonic homogenizer. Single clear phases were obtained for all of the blends shown in Table 2 below.

TABLE 2

| Bio-Distillate, wt. % | FAME, wt. % | ULSD, wt. % |
|---|---|---|
| 0.5 | 0.5 | 99.0 |
| 1.0 | 1.0 | 98.0 |
| 1.5 | 1.5 | 97.0 |
| 2.0 | 2.0 | 96.0 |
| 2.5 | 2.5 | 95.0 |
| 18.8 | 6.2 | 75.0 |
| 12.5 | 12.5 | 75.0 |

TABLE 2-continued

| Bio-Distillate, wt. % | FAME, wt. % | ULSD, wt. % |
|---|---|---|
| 20.0 | 5.0 | 75.0 |
| 21.2 | 3.8 | 75.0 |
| 25.0 | 25.0 | 50.0 |
| 37.5 | 12.5 | 50.0 |
| 40.0 | 10.0 | 50.0 |
| 42.5 | 7.5 | 50.0 |
| 45.0 | 5.0 | 50.0 |
| 47.5 | 2.5 | 50.0 |
| 60.0 | 15.0 | 25.0 |
| 63.7 | 11.3 | 25.0 |
| 67.5 | 7.5 | 25.0 |
| 71.2 | 3.8 | 25.0 |

Example 4

Quantities of the bio-distillate fraction from Example 1 were blended with ULSD to form a blend of 2% bio-distillate (BD), using 1 wt % Hypermer B246 polymer material, with an HLB of 6; and to form another blend of 40% bio-distillate (BD) using 2.5 wt % FAME acquired from the company Houston Biodiesel located in Houston, Tex. The ULSD and the various blends were tested for various properties/components. The results of such tests are reflected in Table 3 below. Table 3 also includes the specified values of those properties for two types of distillate petroleum products, diesel #2 S500 (D2 S500) and fuel oil #2 (FO#2). The resulting blends were observed to be clear and stable and the blends met the conventional distillate specifications.

TABLE 3

| Property | Test Method | D2 S500 Specs | ULSD | 2% BD | FO#2 Specs | 40% BD |
|---|---|---|---|---|---|---|
| Kinematic viscosity, mm$^2$/sec 40° C., | | | | | | |
| Min | D445 | 1.9 | 2.70 | 2.53 | 1.9 | |
| max | | 4.1 | | | 3.4 | |
| Density, (kg/m$^3$ @15° C.), max | D1298 | | | | 876 | 922 |
| Ramsbottom carbon residue on 10% distillation residue, wt %, max | D524 | | | 0.14 | 0.15 | 0.17 |
| Flash Point, ° C., min | D93 | 52 | 60 | 65 | 38 | 71.6 |
| Pour Point, ° C., max | | | | −27 | −6 | −21 |
| Distillation, ° C., v % recovered, T90 | | | | | | |
| Min | D86 | 282 | 320 | 314 | 282 | 314 |
| Max | | 338 | | | 338 | |
| Water and Sediment, v %, max | D2709 | 0.05 | 0 | 0 | 0.05 | 0 |
| Ash wt %, max | D482 | 0.01 | | <10$^{-3}$ | | <10$^{-3}$ |
| Copper Strip Corrosion, max | D130 | No. 3 | | No. 1 | No. 3 | No. 1 |
| Sulfur, ppm | D97 | 500 | 0.05 | | 1000 | 25 |
| Cetane number: one of the following: | | | | | | |
| (A) Cetane Index, min. OR | D613 | 40 | 44.5 | | | |
| (B) (1) Cetane Index, min. | D76 | 40 | 46.3 | 45 | | |
| (2) Aromaticity, % vol, max | D1319 | 35 | 28.2 | 25.2 | | 28.5 |
| Lubricity, HFRR @ 60° C., micron, max | D6079 | 520 | 260 | 260 | | |
| Conductivity, pS/m, max | D2624 | 25 | ~10$^{-4}$ | <1 | | |
| Other properties | | | | | | |
| Relative Density @ 60/60° F. | | | | | | 923 |
| PNA Aromatics | D1319 | | 28.2 | | | 28.5 |
| Olefins | | | 2.2 | | | 1.8 |
| Parafins | | | 69.6 | | | 69.7 |

As can be seen from Table 3 above, the properties of the renewable distillate made by blending bio-distillate, Additive and ULSD fall within the specifications for distillate fuels. The renewable distillate containing 2 wt % biodiesel met specifications for Diesel #2-S500, while the renewable distillate containing 40% biodiesel met Fuel Oil #2 specifications (other than density and Ramsbottom carbon for the 40% BD blend).

Example 5

A low oxygen bio-oil (BO-16) was produced from the conversion of southern yellow pine wood particles by pyrolysis in the presence of a catalyst in a riser reactor operated at a reactor outlet temperature of about 650° C. The resulting bio-oil had an oxygen content of 16.64 weight percent. The composition (in wt %) of the bio-oil is shown below in Table 4.

TABLE 4

|  | BO-16 |
|---|---|
| Aldehydes | 3.5729 |
| Furans | 2.0658 |
| Ketones | 5.6386 |
| Carboxylic Acids | 1.4571 |
| Phenols | 12.994 |
| Indenols | 1.5968 |
| Diols | 4.7505 |
| Naphthols | 0.8184 |
| Hydrocarbons: |  |
| BTEX | 3.1836 |
| Other PAHs | 0.529 |
| Other Benzenes/Toluenes | 1.1576 |
| Indenes | 1.3873 |
| Indanes | 0.1297 |
| Naphthalenes | 0.8483 |
| Volatiles + Semivolatiles | 40.18 |
| Non-volatiles | 59.82 |

Three separate portions of the bio-oil BO-16 were combined with FAME forming a BF5 blend containing 5 wt % FAME, a BF10 blend containing 10 wt % FAME, and a BF15 blend containing 15 wt % FAME. The thermal stabilities of the bio-oil, BF5, BF10, and BF15 were assessed based on changes in viscosity using an accelerated thermal stability test based on the observations of Czernik et al. as reported in Czernik, S.; Johnson, D. K. and Black, S. *Stability of wood fast pyrolysis oil. Biomass and Bioenergy* 1994. 7 (1-6), 187-192. Czernik et al. illustrates that viscosity changes for bio-oil stored 12 weeks at 37° C. corresponds to 6 hours at 90° C. and, hence, that viscosity changes for bio-oil stored 1 year at 37° C. corresponds to 24 hours at 90° C. The accelerated thermal stability test used for the bio-oil, BF5, BF10, and BF15 samples in this example comprised heating the samples to 90° C. and holding the samples at that temperature for up to 48 hours. The viscosity was measured using a modified version of ASTM D2983 using a higher temperature than standard due to the high viscosity of bio-oil at low temperature. Viscosity was measured at 40° C. using a Brookfield viscometer. The accelerated aging test correlates well with the chemical changes in the liquid, associated with polymerization or condensation reactions. (See also, Oasmaa, A. and Kuoppala, E. *Fast pyrolysis of forestry residue. 3. Storage stability of liquid fuel. Energy and Fuels* 2003, 17 (4), 1075-85.) The results of the thermal stability test (expressed as a "Stability Parameter"—SP—which represents the change in viscosity in centipoises (cp) per unit time in hours (h), having the units cp/h and was evaluated as the slope of a plot of viscosity vs. time) are shown in Table 5 below. As can be seen from the data, the SP for the bio-oil/FAME blends BF5, BF10 and BF15 was significantly reduced as compared to the virgin bio-oil.

TABLE 5

| Sample | [FAME], wt % | [O], wt % | SP, cp/h |
|---|---|---|---|
| Bio-oil | 0 | 16.64 | 0.2372 |
| BF5 | 5 | 15.19 | 0.0997 |
| BF10 | 10 | 15.60 | 0.0685 |
| BF15 | 15 | 15.27 | 0.0359 |

Example 6

Two different O-containing bio-oil samples were tested in this example. BO-16 and BO-21 are bio-oil samples with 16 wt % and 21 wt % O-content, respectively. Separate portions of each bio-oil were combined with FAME forming blends containing different proportions of each of these components. Light scattering was used to assess the phase segregation stability of these blends using a Turbiscan MA2000 instrument. Turbiscan is an instrument for measuring light scattering in fluids. This system couples light scattering with a scan of the sample length to give a picture of its homogeneity or changes in homogeneity. The overlay of several scans over time enables stability analysis of the sample from 20 to 50 times faster than visual detection. The detected stability during a 16 h scanning experiment is a measure of the fouling propensity of the blend.

TABLE 6

| Turbiscan assessed stability | | | |
|---|---|---|---|
| Bio-oil | FAME, wt % | Back-scattering Intensity Slope Change (%/hr) | Remarks |
| BO-16 | 0 | 0.0 | Stable |
|  | 5 | 0.0 | Stable |
|  | 10 | 0.0 | Stable |
|  | 15 | 0.0 | Stable |
|  | 25 | 0.0 | Stable |
|  | 30 | 0.0 | Stable |
|  | 40 | −0.02 | Unstable |
|  | 90 | −1.2 | Unstable |
| BO-21 | 5 | 0.0 | Stable |
|  | 10 | 0.0 | Stable |
|  | 15 | 0.0 | Stable |
|  | 20 | 0.0 | Stable |
|  | 25 | 0.0 | Stable |
|  | 30 | −0.1 | Unstable |
|  | 40 | −0.3 | Unstable |
|  | 50 | −0.9 | Unstable |
|  | 75 | −3.0 | Unstable |
|  | 90 | −9.0 | Unstable |

As can be seen, the lower the O-content of the bio-oil, the higher the miscible FAME content to render stable solutions.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

It is the inventors' intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for upgrading bio-oil, comprising:
   a) combining a bio-oil and a diluent to form a feed stream, the bio-oil comprising oxygenated hydrocarbons and having a total oxygen content greater than about 5 wt %;
   b) charging the feed stream to a preheater and heating the feed stream to a temperature in a range of from about 20 to about 450° C., thereby forming a heated feed stream;
   c) charging the heated feed stream to a hydrodeoxygenation unit operated at a temperature in a range of from about 300 to about 500° C. wherein at least a portion of the oxygen is removed from the bio-oil, thereby forming an effluent stream comprising the diluent, water, and an at least partially upgraded bio-oil; and
   d) separating at least a portion of the at least partially upgraded bio-oil from the effluent stream, thereby forming a product stream comprising the at least partially upgraded bio-oil having a total oxygen content lower than the total oxygen content of the bio-oil,
   wherein the diluent is: (i) present in the feed stream in an amount ranging from about 0.5 to about 24.5 wt %; and (ii) selectred from the group consisting of a fatty acid methyl ester (FAME), biodiesel, biomass-derived diesel, a recycled portion of the at least partially upgraded bio-oil, and combinations thereof.

2. The process of claim 1, wherein a portion of the oxygenated hydrocarbons in the feed stream react with each other in at least one of the preheater and the hydrodeoxygenation unit, thereby forming heavier compounds which are deposited in at least one of the preheater and the hydrodeoxygenation unit; and wherein the total amount of heavier compounds deposited in the preheater and in the hydrodeoxygenation unit is less than the total amount of heavier compounds deposited in the preheater and the hydrodeoxygenation unit when the feed stream does not contain the diluent.

3. The process of claim 2, wherein the diluent dilutes the bio-oil in the preheater and the hydrodeoxygenation unit, thereby slowing the reaction of the oxygenated hydrocarbons in the feed stream with each other such that the buildup of carbonaceous deposits in at least one of the preheater and the hydrodeoxygenation unit is minimized or prevented.

4. The process of claim 2, wherein the temperature of the upgraded bio-oil is higher than the temperature of the bio-oil, and wherein the diluent comprises a FAME and a portion of the at least partially upgraded bio-oil; and wherein the inclusion of the at least partially upgraded bio-oil in the feed stream provides heat to the feed stream, thereby: reducing the required heat duty of the preheater, reducing the heated surface temperatures of the preheater, and slowing the reaction of the oxygenated hydrocarbons in the feed stream with each other such that the buildup of carbonaceous deposits in at least one of the preheater and the hydrodeoxygenation unit is minimized or prevented.

5. The process of claim 1, wherein the diluent is present in the feed stream in an amount ranging from about 0.5 to about 10 wt %.

6. The process of claim 1, wherein the product stream further comprises at least a portion of the diluent.

7. A process for upgrading bio-oil, comprising:
   a) combining a bio-oil and a diluent to form a feed stream, the bio-oil comprising oxygenated hydrocarbons and having a total oxygen content greater than about 5 wt %;
   b) charging the feed stream to a preheater and heating the feed stream to a temperature in a range of from about 20 to about 450° C., thereby forming a heated feed stream;
   c) charging the heated feed stream to a hydrodeoxygenation unit comprising at least two stages and operated at a temperature in a range of from about 300 to about 500° C. wherein at least a portion of the oxygen is removed from the bio-oil, thereby forming at least one inter-stage stream comprising partially hydrodeoxygenated bio-oil and an effluent stream comprising the diluent, water, and an at least partially upgraded bio-oil;
   d) separating at least a portion of the at least partially upgraded bio-oil from the effluent stream, thereby forming a product stream comprising the at least partially upgraded bio-oil having a total oxygen content lower than the total oxygen content of the bio-oil, wherein the at least one inter-stage stream and the product stream are each at a higher temperature than the bio-oil; and
   e) utilizing as the diluent at least one of (I) a recycle stream comprising a portion of at least one of: i) the at least one inter-stage stream, and ii) the product stream; (II) a fatty acid methyl ester (FAME); (Ill) biodiesel; and (IV) biomass-derived diesel, and wherein the diluent is present in the feed stream in an amount ranging from about 0.5 to 24.5 wt %.

8. The process of claim 7, wherein the product stream further comprises at least a portion of the diluent.

9. The process of claim 7, wherein a portion of the oxygenated hydrocarbons react with each other in at least one of the preheater and the hydrodeoxygenation unit forming heavier compounds which are deposited in at least one of the preheater and the hydrodeoxygenation unit; and wherein the total amount of heavier compounds deposited in the preheater and the hydrodeoxygenation unit is less than the total amount of heavier compounds deposited in the preheater and the hydrodeoxygenation unit when the feed stream does not contain the diluent.

10. The process of claim 9, wherein the diluent dilutes the bio-oil in the preheater and the hydrodeoxygenation unit, which slows the reaction of the oxygenated hydrocarbons in the feed stream with each other such that the build up of carbonaceous deposits in at least one of the preheater and the hydrodeoxygenation unit is minimized or prevented.

11. The process of claim 9, wherein the inclusion of the recycle stream in the feed stream provides heat to the feed stream, thereby: reducing the required heat duty of the preheater, reducing the heated surface temperatures of the preheater, and slowing the reaction of the oxygenated hydrocarbons in the feed stream with each other such that the build up of carbonaceous deposits in at least one of the preheater and the hydrodeoxygenation unit is minimized or prevented.

12. The process of claim 7, wherein the diluent is present in the feed stream in an amount from about 0.5 to about 10 wt %.

13. A process for upgrading bio-oil, comprising:
   a) combining a bio-oil and a diluent to form a first feed stream, the bio-oil comprising oxygenated hydrocarbons and having a total oxygen content greater than about 5 wt %, wherein the diluent is selected from the group consisting of a fatty acid methyl ester (FAME), biodiesel, biomass-derived diesel, and combinations thereof;
b) charging the first feed stream to a preheater and heating the first feed stream to a temperature in a range of from about 20 to about 100° C., thereby forming a heated first feed stream;
c) combining a recycle stream having a temperature of from about 100 to about 460° C. with the heated first feed stream thereby forming a second feed stream having a temperature in the range of from about 20 to about 450° C., wherein the combined total of the diluent and the recycle stream in the second feed stream is in an amount ranging from about 0.5 to about 24.5 wt %;
d) charging the second feed stream to a hydrodeoxygenation unit comprising at least two stages and operated at a temperature in a range of from about 300 to about 500° C. wherein at least a portion of the oxygen is removed from the bio-oil, thereby forming at least one inter-stage stream comprising partially hydrodeoxygenated bio-oil and an effluent stream comprising the diluent, water, and an at least partially upgraded bio-oil;
e) separating at least a portion of the at least partially upgraded bio-oil from the effluent stream, thereby forming a product stream comprising the at least partially upgraded bio-oil having a total oxygen content lower than the total oxygen content of the bio-oil, wherein the at least one inter-stage stream and the product stream are each at a higher temperature than the bio-oil; and
f) utilizing as the recycle stream a portion of at least one of: i) the at least one inter-stage stream, and ii) the product stream.

14. The process of claim 13, wherein the preheater provides from greater than 0 to about 30 % of the heat needed to raise the temperature of the second feed stream to a temperature in the range of from about 20 to about 450° C.

15. The process of claim 13, wherein the product stream further comprises at least a portion of the diluent.

16. The process of claim 13, wherein a portion of the oxygenated hydrocarbons react with each other in at least one of the preheater and the hydrodeoxygenation unit, thereby forming heavier compounds which are deposited in at least one of the preheater and the hydrodeoxygenation unit; and wherein the total amount of heavier compounds deposited in the preheater and the hydrodeoxygenation unit is less than the total amount of heavier compounds deposited in the preheater and the hydrodeoxygenation unit when the diluent and the recycle stream are not combined with the bio-oil.

17. The process of claim 16, wherein the diluent dilutes the bio-oil in the hydrodeoxygenation unit and the preheater, which slows the reaction of the oxygenated hydrocarbons in the feed stream with each other such that the buildup of carbonaceous deposits in at least one of the preheater and the hydrodeoxygenation unit is minimized or prevented.

18. The process of claim 13, wherein the combination of the recycle stream and the heated first feed stream provides heat to the second feed stream, thereby: reducing the required heat duty of the preheater, reducing the heated surface temperatures of the preheater, and slowing the reaction of the oxygenated hydrocarbons with each other such that the buildup of carbonaceous deposits in at least one of the preheater and the hydrodeoxygenation unit is minimized or prevented.

19. The process of claim 13, wherein the combined total of the diluent and the recycle stream in the second feed stream is from about 0.5 to about 10 wt %.

20. A process for upgrading bio-oil, comprising:
a) combining a bio-oil and a diluent to form a feed stream, the bio-oil comprising oxygenated hydrocarbons and having a total oxygen content greater than about 5 wt %;
b) charging a portion of the feed stream as a preheater feed stream to a preheater and heating the preheater feed stream to a temperature in a range of from about 20 to about 450° C., thereby forming a heated feed stream;
c) charging the heated feed stream to a hydrodeoxygenation unit comprising at least two stages and operated at a temperature in a range of from about 300 to about 500° C., wherein at least a portion of the oxygen is removed from the bio-oil, thereby forming at least one inter-stage stream comprising partially hydrodeoxygenated bio-oil and an effluent stream comprising the diluent, water, and an at least partially upgraded bio-oil;
d) charging a portion of the feed stream as a quench to at least one of the inter-stage streams to form a quenched inter-stage stream and control the temperature of the downstream stages; and
e) separating at least a portion of the at least partially upgraded bio-oil from the effluent stream, thereby forming a product stream comprising the at least partially upgraded bio-oil having a total oxygen content lower than the total oxygen content of the bio-oil,
wherein the diluent is (I) present in the feed stream in an amount ranging from about 0.5 to 24.5 wt %; and (II) selected from the group consisting of (i) a fatty acid methyl ester (FAME), (ii) biodiesel, (iii) biomass-derived diesel, (iv) a recycle stream selected from the group consisting of: at least one of the inter-stage streams, at least one of the quenched inter-stage streams, the product stream, and combinations thereof, and (v) combinations thereof.

21. The process of claim 20, wherein a portion of the oxygenated hydrocarbons react with each other in at least one of the preheater and the hydrodeoxygenation unit, thereby forming heavier compounds which are deposited in at least one of the preheater and the hydrodeoxygenation unit; and wherein the total amount of heavier compounds deposited in the preheater and the hydrodeoxygenation unit is less than the total amount of heavier compounds deposited in the preheater and the hydrodeoxygenation unit when the feed stream does not contain the diluent.

22. The process of claim 21, wherein the diluent dilutes the bio-oil in the preheater and the hydrodeoxygenation unit, which slows the reaction of the oxygenated hydrocarbons in the feed stream with each other such that the buildup of carbonaceous deposits in at least one of the preheater and the hydrodeoxygenation unit is minimized or prevented.

23. The process of claim 20, wherein the diluent is present in the feed stream in an amount of from about 0.5 to about 10 wt %.

24. The process of claim 20, wherein the temperature of the recycle stream is higher than the temperature of the bio-oil, and wherein the diluent comprises a FAME and the recycle stream; and wherein the inclusion of the recycle stream in the diluent provides heat to the feed stream, thereby: reducing the required heat duty of the preheater, reducing the heated surface temperatures of the preheater, and slowing the reaction of the oxygenated hydrocarbons with each other in the feed stream such that the buildup of carbonaceous deposits in at least one of the preheater and the hydrodeoxygenation unit is minimized or prevented.

25. The process of claim 20, wherein the product stream further comprises at least a portion of the diluent.

* * * * *